United States Patent [19]

Douglas

[11] Patent Number: 5,330,184
[45] Date of Patent: Jul. 19, 1994

[54] RUBBER COMPOUND FOR HOCKEY PUCKS

[76] Inventor: Nolan E. Douglas, 4311 Ida Dr., Akron, Ohio 44319

[21] Appl. No.: 978,242

[22] Filed: Nov. 18, 1992

[51] Int. Cl.$^5$ .................. A63B 71/00; C08L 27/00
[52] U.S. Cl. ............................ 273/128 R; 524/526
[58] Field of Search .................. 273/128 R; 524/526

[56] References Cited

U.S. PATENT DOCUMENTS 3,704,891 12/1972 Chiarelli ........................ 273/128 R

OTHER PUBLICATIONS

Jack Mason, *For Hockey Fans the Puck Starts Here*, Oct. 8, 1990 of *Sports Illustrated*, vol. 73, Issue 15.

*Primary Examiner*—Joseph L. Schofer
*Assistant Examiner*—Peter D. Mulcahy
*Attorney, Agent, or Firm*—Renner, Kenner, Greive, Bobak, Taylor & Weber

[57] ABSTRACT

A rubber compound having a low coefficient of restitution which remains constant over a wide temperature range of from about 40° C. to about −40° C. Such compounds include from about 30 to 50 parts by weight natural rubber, from about 35 to 55 parts by weight of a high styrene, SBR masterbatch and from about 10 to 20 parts by weight halogenated butyl rubber to total 100 parts by weight, and from 30 to 45 parts by weight of a plasticizer, per 100 parts by weight of rubber. Hockey pucks and other articles are manufactured from the rubber compounds having the low, consistent coefficient of restitution and act like "dead" objects that have consistently little bounce. The rubber compounds which comprise the pucks and other articles may be black or colorable and may have additional surface materials thereon to improve the visual qualities of the puck so that it can be more readily visible on video.

11 Claims, No Drawings

RUBBER COMPOUND FOR HOCKEY PUCKS

TECHNICAL FIELD

The invention herein relates to a novel rubber composition having a consistent, low coefficient of restitution over a broad temperature range. Such a compound is desirable for use in articles such as hockey pucks where little or no bounce is desirable. More particularly, the rubber articles employing the composition of the present invention exhibit several superior physical characteristics over a broad temperature range so as to create articles of greater durability and consistency in bounce and rebound. In hockey pucks, the need to freeze the puck before a game is eliminated by the use of a puck having the composition of the present invention. Furthermore, the composition of the present invention is not affected by the incorporation of coloring pigments or adhesion of visual materials to the surface thereof. The compounds of the present invention comprise many ingredients that are currently commercially available.

BACKGROUND OF THE INVENTION

Hockey pucks are rubber disks having a thickness of about one inch, a diameter of about three inches, and weighing about six ounces. Various rubber compositions for hockey pucks have been devised over the years with most, if not all, of these compositions including natural and synthetic rubber at a ratio of about 1 to 9 as their basic ingredients.

Desirably, hockey pucks should exhibit the quality of being "dead" objects on the ice. That is, the pucks should have little or no bounce to them. Such bounciness is determined by the coefficient of restitution exhibited by the puck. The lower the coefficient of restitution, the less bounce the puck will have. Thus, the puck, upon hitting an object such as the ice rink wall, will drop to the ice rather than rebounding quickly from the wall.

Heretofore, hockey pucks have had to be frozen prior to a game in order to lower the coefficient of restitution. However, during the game, the pucks warm up and therefore, the coefficient of restitution increases, resulting in the same adverse properties which were initially eliminated with the freezing of the puck. Desirably, the puck should have the same consistent rebound and bounce no matter what the temperature of the rubber puck is.

Notwithstanding the disadvantages associated with freezing them, the pucks of the prior art have also been known to chip or peel during play. As the pucks are used over and over, they have a tendency to chip or be cut during use. Thus, it would be desirable to produce a puck which exhibits superior cut strength and increases chip and abrasion resistance as compared to other pucks of the prior art. More importantly, it is desirable to produce such a puck which would display little or no change in these properties no matter what the temperature and other conditions are.

Difficulty is often experienced by spectators of hockey games in seeking to track the puck. The problem is accentuated when the game is viewed through electronic media such as television. Accordingly, there is a need to make hockey pucks of a more visible nature. It is noted from an article in the Oct. 8, 1990 edition of Sports Illustrated (Vol. 73, Issue 15) that various colored pucks have been attempted. Many have been painted, but the paint came off under game conditions. Plastic coatings were used, but were too costly. Dyes were used, but faded or caused the puck to warp. Others became mushy and bounced unpredictably upon extensive use. However, the rubber composition of the puck is believed to be at least partially to blame for the problems associated with colored pucks. Therefore, a rubber composition for a puck which is not affected by the incorporation of coloring pigments or dyes and/or permits adhesion of visual materials and coatings to the surface thereof is believed to be highly desirable.

SUMMARY OF INVENTION

In light of the foregoing, it is a first aspect of the present invention to provide a rubber composition which possesses a low coefficient of restitution.

Another aspect of the present invention is to provide a rubber composition, as above, that maintains a consistent coefficient of restitution over a wide range of temperatures.

Still another aspect of the present invention is to provide a rubber composition, as above, which exhibits superior physical property characteristics such as cut strength, chip resistance, and abrasion resistance as compared to other rubber compounds over a broad temperature range.

Yet another aspect of the present invention is to provide a rubber composition, as above, which can be employed to produce a hockey puck which acts like a "dead" object and does not have to be frozen to have a low coefficient of restitution.

A further aspect of the present invention is to provide a rubber composition, as above, which may incorporate coloring pigments or dyes and/or permit adhesion of visual materials and coatings to the surface thereof.

The foregoing and other aspects of the invention which will become apparent as the detailed description proceeds are achieved by a rubber compound including from about 30 to 50 parts by weight of natural rubber; from about 35 to 55 parts by weight of a high styrene, SBR masterbatch having a total weight of styrene of at least 50 percent by weight of the masterbatch; from about 10 to 20 parts by weight of halogenated butyl rubber to total 100 parts by weight of rubber; and from about 30 to 45 parts by weight of a plasticizer, per 100 parts by weight of rubber.

Other aspects of the invention which will become apparent herein as achieved by a hockey puck including a rubber compound having a low coefficient of restitution including from about 30 to 50 parts by weight of natural rubber; from about 35 to 55 parts by weight of a high styrene, SBR masterbatch having a total available weight of styrene of at least 50 percent by weight of the masterbatch and from about 10 to 20 parts by weight of halogenated butyl rubber to total 100 parts by weight of rubber; and from about 30 to 45 parts by weight of a plasticizer, per 100 parts by weight of rubber.

PREFERRED EMBODIMENT FOR CARRYING OUT THE INVENTION

As noted hereinabove, the present invention is directed toward rubber compounds which have a low coefficient of restitution and which maintain that coefficient of restitution over a broad temperature range. Such compounds have utility in the manufacture of articles such as hockey pucks and the like where a consistent bounce or rebound is desired. The compounds of the present invention possess certain properties which result in the articles fabricated therefrom being essentially "dead" objects, over a wide range of temperatures, while maintaining or increasing the durability of the article with respect to cut strength, chip resistance and abrasion resistance.

The rubber compounds according to the present invention comprise a blend of three rubber components: natural rubber; a high styrene resin, SBR (styrene butadiene rubber) masterbatch; and halogenated butyl rubber. This blend of rubber components in the appropriate amounts as provided hereinbelow, together with a low temperature plasticizer, provide the characteristics desired in hockey pucks over a temperature of from at least about 40° C. to at least about −40° C.

Any standard natural rubber may be employed in the rubber compound of the present invention. One particularly suitable grade of natural rubber is SMR 5 (Standard Malaysian Rubber). The natural rubber employed in the compound helps to prevent the rubber compound from freezing at relatively low temperatures.

The high styrene resin, SBR masterbatch provides high modulus and high hardness properties to the compound. Such resin masterbatches are emulsion masterbatches and preferably comprise from about 40 to 48 percent by weight of emulsion SBR and from 60 to 52 percent by weight high styrene resin, with a total weight of available styrene in the resin masterbatch product being at least 50 percent by weight. These materials are available from Ameripol Synpol Company, a division of the Uniroyal Goodrich Tire Company, as tradenames 1903 and 1904. The 1903 material comprises 48 percent by weight SBR 1502 (BR Tg about −100° C., styrene Tg about +100° C.) and 52 percent by weight high styrene resin (Tg about +100° C.) with 56 percent by weight total available styrene in the product. The 1904 material comprises 40 percent by weight SBR 1502 (BR Tg about −100° C., styrene Tg about +100° C.) and 60 percent by weight high styrene resin (Tg about +100° C.) with 60 percent by weight total available styrene in the product.

The halogenated butyl rubber exhibits excellent low rebound properties which essentially make the article made from the rubber compound of the present invention a "dead" object. Suitable halogenated butyl rubber may be selected from the group consisting of chlorobutyl rubber and bromobutyl rubber and mixtures thereof. Particularly useful is chlorobutyl rubber having a chlorine content of about 1.1 to 1.3 percent by weight of the total available chlorobutyl rubber component. These materials are available from the Exxon Chemical Company of Dallas, Tex., as tradenames HT-1066 and HT-1068.

The compounds of the present invention comprise from about 30 to 50 parts by weight of natural rubber, from about 35 to 55 parts by weight of high styrene resin, SBR masterbatch, and from about 10 to 20 pans by weight halobutyl rubber, to total 100 parts by weight of rubber (phr). Additionally, the compounds of the present invention comprise from about 30 to 45 phr of a low temperature plasticizer. Particularly useful is dioctylphthalate oil (DOP Oil) or di(butoxy-ethoxy-ethyl) formal (TP-90-B Oil), two low temperature plasticizers which may be added to the rubber polymers as processing aids to improve flexibility and help keep the compound from freezing at low temperatures. It should be understood that other plasticizers may be suitable for use in the rubber composition of the present invention, provided they have low temperature characteristics.

Additives such as fillers, reinforcing materials, antioxidants, curing agents, accelerators, and processing materials can also be added to the rubber compounds. However, it should be understood that such components are well known to those skilled in the art and thus, the present invention is not necessarily limited to the use of any particular additives or amounts thereof. Moreover, the additives which can be added may vary substantially depending upon whether the article to be produced, i.e., a hockey puck, is black in color or some other color.

For example, compounds of the present invention which are used to produce black hockey pucks may include from about 95 to 120 phr carbon black as filler material. Particularly useful is FEF (fast extrusion furnace) Black, a relatively high structure and large particle size carbon black. Further discussions of such carbon blacks can be found in the literature. See, for example, *The Vanderbilt Rubber Handbook*, pp. 408-424, RT Vanderbilt Co., Norwalk, Conn. 06855 (1979).

In colored pucks, a "non-black" reinforcer material such as silicon dioxide silican, titanium dioxide, etc., may be substituted for the carbon black. Preferably, from about 35 to 45 phr silicon dioxide is employed. Particularly useful is Hi Sil 233, a silicon dioxide available from PPG Industries of Pittsburgh, Pa.

Other fillers and reinforcing materials may also be added. For instance, in the black puck, the present invention may include from about 65 to 85 phr hard clay. In the colored puck, from about 35 to 45 phr hard clay may be added. Preferably, extra white hard clay available from Akrochem Company of Akron, Ohio under the tradename EW-150 is used. In addition, from about 85 to 105 phr silane-treated clay may preferably be added to the compound for the colored puck. This material is available from J. M. Huber Corp. of Macon, Ga., under the tradename Zeolex 23. All of the fillers and reinforcing materials may help to provide the rubber composition with a low coefficient of restitution at freezing temperatures as well as room temperature. Additional fillers may include ground coal, calcium carbonate, clay, silica, cryogenically ground rubber and the like.

Also included in the compounds can be effective amounts of curing agents such as sulfur, and various accelerators as are commonly used in the art. Preferably, sulfur is employed in amounts of about 0.7 to 3 phr. Other processing aids such as low molecular weight polyethylene, petroleum jelly, and the like may be added in effective amounts as is common for rubber compounds. Moreover, tackifiers and wetting agents may also be included. Conventional antioxidants may also be employed as needed. None of these ingredients should be included individually in an amount of more than 12 phr, with most of them being added in amounts ranging from about 0.1 to 4 phr.

In addition to these ingredients, the rubber compounds may contain coloring pigments. In black hockey pucks, ink black may be added in an amount of from 0 to 10 phr, and preferably 2 phr. In colored pucks, a coloring pigment or surface flakes providing improved visual qualities through electronic media, e.g., television, may be added in an amount ranging from 0 to 4 phr, and preferably, at about 2 phr. It is preferred that fluorescent coloring pigment be employed inasmuch as it is believed that such pigment provides the better visual qualities when seen through electronic media. Nevertheless, it will be appreciated that any color variation can be employed, i.e., color and shade, fluorescent, reflective, luminescent, etc.

Furthermore, for hockey pucks, any variety of surface materials may be utilized to enhance the visual effect of the puck over electronic video media, i.e., television. These include metal flakes, metal powder, or mirroring or reflecting film. Where such mirroring or reflecting film materials are utilized, the materials are preferably heat stamped onto the article. For instance, mirror film materials available from Crown Roll Leaf, Inc. of Patterson, N.J. can be heat stamped at a temperature of about 200° C. onto a hockey puck comprising the rubber compound of the present invention. These materials produce a holographic effect. Hence, the surface materials provide an improved visual quality to the puck so that it can be more easily seen on video and any other electronic medium.

The ingredients of the rubber compound can be admixed, utilizing an internal mixer, such as a Banbury mixer, or other standard rubber mixers suitable for forming viscous relatively uniform admixtures. In the preferred embodiment, the rubber components are initially mixed together. Then, any antioxidants and sulfur are added followed by the dry or powdery materials such as the fillers and reinforcing materials as well as the plasticizers. Next, any processing oils or waxy materials are added and finally the accelerators, including zinc oxide and the like, are mixed therein.

The resulting admixture is then preferably rolled into the form of a sheet by conventional sheeting methods, for example, milling, calendaring, or extrusion. The sheets may be cooled in a bath and then cut into blanks by conventional methods. Many hockey pucks are blanked using a Barwell machine. The Barwell pushes the rubber compound through holes that admit the precise amount of compound required to form each puck. The articles to be formed from the compound are then injection molded or compression molded in the conventional manner. Many hockey pucks are then imprinted with a tread (called a knurling) around the circumference thereof. Any labels or surface materials may then be added as discussed hereinabove.

As examples of rubber compounds according to the present invention, two formulations have been provided in Table I, as Compound 1 and Compound 2. Compound 1 is a formulation for producing a rubber compound for use in a black hockey puck, while Compound 2 is a formulation for producing a rubber compound for use in a colored puck. The high styrene resin, SBR masterbatch is designated as High styrene/SBR in Table I. All non-rubber parts are presented on the basis of parts by weight per hundred rubber by weight (phr). To the fight of each compound, Table I lists a range of suitable amounts for each component. The compounds of the present invention can contain a plurality of additives selected from the group consisting of conventional antioxidants, antiozonants, fillers, reinforcing materials, curing agents, accelerators, processing agents and the like, as is shown for Compounds 1 and 2. It should be understood, however, that such components are well known to those skilled in the art and thus, the present invention is not necessarily limited to the use of any particular additives or amounts thereof. Similarly, the practice of the present invention is also not necessarily limited to the specific formulations of Compounds 1 and 2.

TABLE I

| COMPOUNDS FOR HOCKEY PUCKS | | | | |
| --- | --- | --- | --- | --- |
| | Compound 1 | Ranges | Compound 2 | Ranges |
| Natural Rubber | 40 | 30–50 | 40 | 30–50 |
| High Styrene/SBR | 45 | 35–55 | 45 | 35–55 |
| Chlorobutyl rubber | 15 | 10–20 | 15 | 10–20 |
| Antioxidant[a] | 1 | 1–1.5 | 0.5 | 0.5–1 |
| FEF carbon black | 108 | 95–120 | — | — |
| Reinforcer[b] | — | — | 40 | 35–45 |
| Reinforcer[c] | — | — | 95 | 85–105 |
| Hard Clay | 75 | 65–85 | 40 | 35–45 |
| Plasticizer[d] | 38 | 30–45 | 38 | 30–45 |
| Polyethylene/Dry Liquid Concentrate[e] | 2 | 0–4 | 2 | 0–4 |
| Petroleum Jelly[f] | 4 | 2–6 | — | — |
| Tackifier[g] | — | — | 10 | 8–12 |
| Wetting Agent[h] | 1 | 1–2 | — | — |
| Processing Agent[i] | 2 | 1–3 | — | — |
| Stearic Acid | 2 | 1–3 | 2 | 1–3 |
| Zinc Oxide | 10 | 8–12 | 10.0 | 8–12 |
| Sulfur | 2.7 | 2.4–3 | 0.8 | 0.75–0.85 |
| Accelerator[j] | 1 | 0.95–1.05 | — | — |
| Accelerator[k] | 0.1 | 0.095–0.105 | — | — |
| Accelerator[l] | — | — | 1.5 | 1.4–1.6 |
| Accelerator[m] | — | — | 0.2 | 0.19–0.21 |
| TOTAL | 346.8 | | 340 | |

[a]Octamine, the reaction product of diphenylamine and diisobutylene or Antioxidant 33, a non-staining antioxidant
[b]Hi Sil 233 (silicon dioxide)
[c]Zeolex 23 (silane-treated clay)
[d]DOP Oil (dioctylphathalate) or TP-90-B Oil (di(butoxy-ethoxy-ethyl)formal)
[e]Poly 1702 DLC or Natrocel PE (low molecular weight polyethylene)
[f]Petrolatum DLC
[g]Petrorex 100 (hydrocarbon resin and low-melt tackifier)
[h]Carbon Wax 3350 (polyethylene glycol)
[i]Strucktol WB22 (fatty acid)
[j]CBTS (cyclobenzyl thiazole sulfenamide)
[k]Methyl zimate (zinc dimethyldithiocarbamate)
[l]BBTS or Santocure NS (N-tert-butyl-2-benzothiazyl sulfenamide)
[m]TMTD (tetramethyl thiuram disulfide)

Upon molding into a puck, several physical properties of Compound 1 were measured and compared to those properties for the rubber compounds in other hockey pucks. More specifically, Compound 1 was tested against a puck produced by an unknown entity in Czechoslovakia, a puck produced by Viceroy Corporation of Canada, and a puck produced by the General Tire Corporation in Canada. While the exact composition of each of these pucks is proprietary, it is believed that none of the pucks employ natural rubber, a high styrene, SBR masterbatch, and halogenated butyl rubber as well as a plasticizer in their rubber compounds. A comparison of the physical characteristics is reported in Table II.

by the distance the ball was dropped and taking the square root thereof.

$$\sqrt{\frac{\text{distance rebound (cm)}}{\text{distance dropped (cm)}}}$$

As can be seen in Table II, the rubber compound of the present invention is the only compound which has the same coefficient of restitution at both about 24° C. and −10° C. Accordingly, the puck displays a constant rebound which is desirable of pucks in the game of hockey. Furthermore, the puck need not be frozen to exhibit these properties. The Czechoslovakian puck and

TABLE II

Physical Data for Compound I as Compared to Other Compounds for Pucks

| | Compound I | Czechoslovakia | Canada (Viceroy) | Canada (Gen. Tire) |
|---|---|---|---|---|
| Mass (g) | 161.7 | 168.2 | 157.6 | 157.1 |
| Density (g/cm$^3$) | 1.4 | 1.43 | 1.34 | 11.41 |
| Durometer Shore A 24° C. | 87 | 88 | 85 | 89 |
| Distance Rebound (ball dropped at 45.5 cm) (cm) | | | | |
| 24° C. | 7.5 | 9.2 | 9.5 | 7 |
| −10° C. | 7.5 | 5 | 4 | 8 |
| Coefficient of Restitution | | | | |
| 24° C. | 0.41 | 0.45 | 0.46 | 0.40 |
| −10° C. | 0.41 | 0.33 | 0.30 | 0.42 |
| Percent Change in Coefficient of Restitution (±3%) | 0% | 27% | 35% | 3% |
| Percent Rebound | | | | |
| 24° C. | 16.5% | 20.2% | 20.9% | 15.4% |
| −10° C. | 16.5% | 11% | 8.8% | 17.6% |

From the results reported in Table II, it is apparent that the rubber compound of the present invention provides a low coefficient of restitution and is constant in bounce and rebound. In order to show that the puck employing the rubber compound of the present invention had generally the same mass and density of the pucks of the prior art, the mass and density of each puck was determined. Notably, the Czechoslovakian puck was the heaviest, but all of the pucks weighed between 168.2 grams and 157.1 grams. The average density of each puck was determined by measurement of each puck's dimensions and by Archimedes' method which is well known to those of ordinary skill in the art. Again, the Czechoslovakian puck had the highest density, while the Viceroy puck had the lowest density. All of the pucks had densities ranging between about 1.43 and 1.34 grams per cubic centimeter.

Next, as shown in Table II, the Shore A hardness of each puck was also determined. Preferably, high hardness is desired and the hardness range should be within from about 80 to 97 on the Shore A hardness scale at 24° C. A durometer was used to determine the hardness of each puck, and each puck comfortably fell within the desired range on the Shore A hardness scale, between 85 and 89.

The coefficient of restitution was determined for each puck at about 24° C. and at about −10° C. Desirably, the coefficient of restitution should be around 0.4. The characteristic was measured by a machine which measures the distance of rebound of a steel ball dropped approximately 45.5 centimeters on the flat surface of each puck. The coefficient of restitution may then be calculated by dividing the distance the ball rebounded the Viceroy puck have a 27 percent and 35 percent decrease in the coefficient of restitution, respectively, between the temperatures of about 24° C. and −10° C. The General Tire puck is unique in that there was a slight increase of about 3 percent in the coefficient of restitution when the puck was cooled from about 24° C. to about −10° C.

Furthermore, although not shown in any Table, the rubber compounds of the present invention have superior cut strength, increased chip resistance and increased abrasion resistance as compared to other pucks. Notably, it is very difficult to chip or peel the pucks which comprise compounds of the present invention. Unlike other pucks examined, one cannot easily scrape the surface of puck or chip the edges thereof with a fingernail. While the example compared above (Compound 1) was for a black hockey puck, it is to be understood that the compound used to produce the colored hockey puck can achieve the same qualities as the black puck. Moreover, any puck made from the rubber compounds of the present invention may include a film material which can be heat stamped on the puck.

Thus it should be evident from the foregoing disclosure that the rubber compounds of the present invention have a low coefficient of restitution which remains constant upon cooling. The invention is particularly suited for use in hockey pucks, but is not necessarily limited thereto. The compounds of the present invention can be used separately with other articles as noted hereinabove. Where the compounds are used for hockey pucks, the characteristics provided by the compounds result in pucks which do not bounce and which rebound consistently and properly off the ice rink wall.

Moreover, as noted hereinabove, the present invention should not be limited to the use of such rubber compounds as hockey pucks. Thus, it is believed that any of the variables disclosed herein, including the selection of specific component ingredients can readily be determined and controlled without departing from the scope and spirit of the invention herein disclosed and described. Moreover, the scope of the invention shall include all modifications and variations that fall within the scope of the attached claims.

What is claimed is:

1. A hockey puck for ice hockey comprising a rubber compound having a relatively constant low coefficient of restitution at variable temperatures comprising:
   from about 30 to 50 parts by weight of natural rubber;
   from about 35 to 55 parts by weight of a masterbatch comprising styrene-butadiene rubber and high styrene resin, said masterbatch having a total available weight of styrene of at least 50 percent by weight of said masterbatch;
   from about 10 to 20 parts by weight of halogenated butyl rubber to total 100 parts by weight of rubber; and
   from about 35 to 45 parts by weight of a plasticizer, per 100 parts by weight of rubber.

2. A hockey puck, as set forth in claim 1, wherein said coefficient of restitution of said compound is constant for temperatures ranging from about 40° C. to about −40° C.

3. A hockey puck, as set forth in claim 1, wherein said coefficient of restitution of said compound is about 0.4 at about 24° C. and about 0.4 at about −10° C.

4. A hockey puck, as set forth in claim 1, wherein said compound has a Shore A hardness of from about 80 to 97.

5. A hockey puck, as set forth in claim 1, further comprising additional additives selected from the group consisting of fillers, reinforcing materials, antioxidants, curing agents, accelerators, processing materials and mixtures thereof.

6. A hockey puck, as set forth in claim 1, further comprising from about 0 to 10 parts coloring pigment, per 100 parts of rubber.

7. A hockey puck, as set forth in claim 1, having improved cut strength, increased chip resistance, and increased abrasion resistance.

8. A hockey puck, as set forth in claim 1, further comprising a smooth surface and film material heat stamped thereon.

9. A hockey puck, as set forth in claim 8, wherein said film material produces a holographic effect so as to enhance the visual effect of said puck over electronic video media.

10. A hockey puck, as set forth in claim 1, further comprising materials selected from the group consisting of metal flakes, metal powders, mirroring materials, and reflecting materials, to provide color to the surface of said hockey puck.

11. A hockey puck, as set forth in claim 1, which maintains its same physical characteristics over a range of temperatures from about 40° C. to about −40° C.

* * * * *